A. EIMER.
PRESSURE AND RELIEF PUMP.
APPLICATION FILED AUG. 13, 1912.
1,091,566. Patented Mar. 31, 1914.
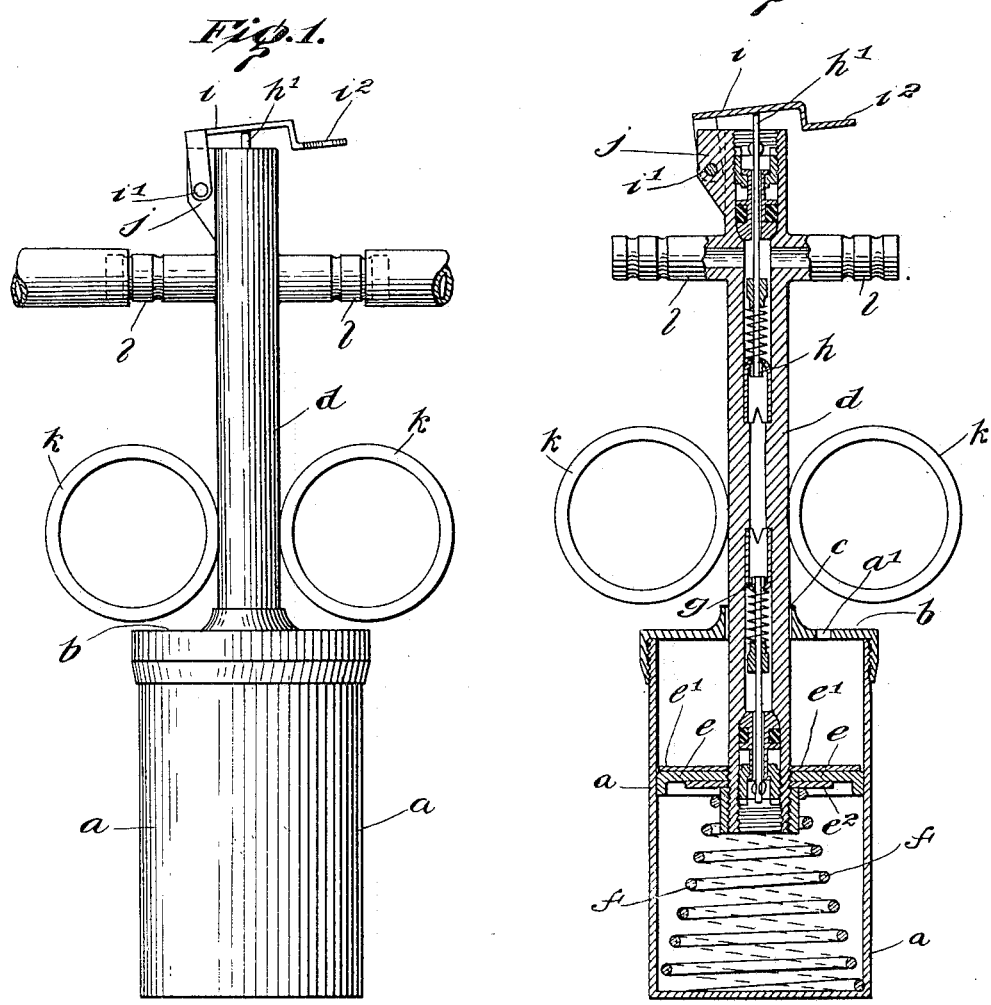

UNITED STATES PATENT OFFICE.

AUGUST EIMER, OF NEW YORK, N. Y.

PRESSURE AND RELIEF PUMP.

1,091,566.  Specification of Letters Patent.  Patented Mar. 31, 1914.

Application filed August 13, 1912. Serial No. 714,940.

*To all whom it may concern:*

Be it known that I, AUGUST EIMER, a citizen of the United States, and resident of the borough of Manhattan, in the city, county, and State of New York, have invented certain new and useful Improvements in Pressure and Relief Pumps, of which the following is a specification.

This invention relates to small, hand pumps for air or other gaseous fluid, such as may be used, for example, to charge with air or gas pressure the cuffs employed with sphygmomanometers, and my improvements are directed to certain structural features and arrangements of parts, whereby a compactly formed pump, of the character designated, can be held and manipulated by a single hand, and whereby a pressure relief device in said pump can be operated by a finger of the same hand.

In apparatus like a sphygmomanometer, it is important that the pumping device should be entirely controlled by one of the operator's hands as he requires the other hand to be free for manipulating the radial pulse or for other purposes, this need supplying the occasion for my present invention.

In brief my improvements comprise a closed cylinder containing a flexible plunger which admits air on its upstroke, and having spring means to effect or assist such upstroke; a hollow stem for said plunger, with finger hold attachments whereby the stem and plunger may be moved in its downstroke, during which the air is compressed and expelled through the hollow stem; a spring valve in the stem which opens for the passage of the compressed air, and hollow branches in the stem to conduct the air pressure respectively to a sphygmomanometer cuff and a pressure indicator, or to other appliances; together with a spring seated relief valve in the hollow stem and a finger trip device for said relief valve.

In the drawing,—Figure 1 is an elevation of my improved pump, and Fig. 2 is a vertical sectional view thereof.

In the construction of my improved pump I provide a cylinder $a$, closed at the bottom, and having a screw cover $b$, which has a central orifice $c$ to receive hollow stem or plunger rod $d$. Said hollow stem carries, within the cylinder, a flexible plunger $e$, which is of leather, rubber, or the like; covering washer $e'$, and a lower washer $e^2$ of smaller diameter. The flexible plunger $e$ is of inverted cup shape, whereby in descent its peripheral edge expands and hugs the cylinder wall under the air pressure met, and forces the compressed air into the hollow stem, for distribution. In the return movement of the flexible plunger, its peripheral edge contracts, permitting air, which has entered the upper part of cylinder $a$ through aperture $a'$ in the cap, to seep past said plunger into the lower portion of the cylinder, to satisfy the partial vacuum created therein. A spring $f$ assists the return movement of said plunger. The lower portion of hollow stem $d$ is provided with an inwardly opening spring valve $g$ of the general character of the well known valves used with pneumatic tires, said valve opening under the pressure of the downward stroke of the pump, and closing upon the relaxation of said pressure, thereby maintaining the air pressure in said hollow stem and its communicating parts. Similarly, at the upper end of hollow stem $d$ there is provided a corresponding inwardly opening spring valve $h$, whose stem $h'$ extends beyond the top of said hollow stem. A lever $i$, fulcrumed as at $i'$, in an offset $j$ attached to the outer surface of hollow stem $d$, extends over the top of projecting stem $h'$, in position to depress said stem $h'$ in order to open valve $h$. Said lever $i$ has a finger piece $i''$ whereby it may be conveniently actuated by the operator's finger. The purpose of this spring valve $h$ is to relieve the pressure when an excess thereof is registered on the pressure indicator, it being desirable in some instances, as with sphygmomanometers, to work under varying pressure conditions, determined by the particular case, and exactitude in the pressure employed is necessary in such instances. The hollow stem $d$ has, attached to its surface, the oppositely disposed finger rings or grips $k$ $k$, by whose means the plunger may be reciprocated in the cylinder while grasping the entire device in one hand. The hollow stem $d$ is also provided with branches $l$ $l$, which communicate with the interior of said hollow stem at a point intermediate the valves $g$ $h$. Said branches are adapted to connect with rubber or other tubing, leading to such devices as a sphygmomanometer cuff and pressure indicator, or they may lead to any other device to which it may be desirable to supply fluid pressure.

I claim:

A pressure pump of compact form, to be held and manipulated by a single hand, said pump comprising a cylinder, a flexible plunger therein, a hollow stem to depress said plunger, and a return spring therefor, a spring valve in said stem to admit pressure thereto, hollow branches on said stem to communicate pressure to connecting devices, actuating finger rings on said stem, a spring relief valve in said hollow stem, the stem of said relief valve extending outside said hollow stem, and a pivotal finger trip device to actuate said relief valve stem.

Signed at the borough of Manhattan, in the city county, and State of New York, this 7th day of August, A. D. 1912.

AUGUST EIMER.

Witnesses:
SADIE R. SEMLEAR,
F. W. BARKER.

Copies of this patent may be obtained for five cents each, by addressing the "Commissioner of Patents, Washington, D. C."